US012763001B2

(12) United States Patent
Park

(10) Patent No.: US 12,763,001 B2
(45) Date of Patent: Oct. 13, 2026

(54) DISPLAY PANEL DRIVING CIRCUIT AND DISPLAY DEVICE INCLUDING THE SAME

(71) Applicant: LG Display Co., Ltd., Seoul (KR)

(72) Inventor: Se Dong Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/966,721

(22) Filed: Dec. 3, 2024

(65) Prior Publication Data

US 2025/0265971 A1 Aug. 21, 2025

(30) Foreign Application Priority Data

Feb. 20, 2024 (KR) ........................ 10-2024-0024339

(51) Int. Cl.
*G09G 3/32* (2016.01)

(52) U.S. Cl.
CPC ........... *G09G 3/32* (2013.01); *G09G 2310/08* (2013.01); *G09G 2320/0247* (2013.01); *G09G 2320/064* (2013.01); *G09G 2330/021* (2013.01)

(58) Field of Classification Search
CPC .. G09G 5/10; G09G 3/32; G09G 3/20; G09G 5/18; G09G 2310/08; G09G 2320/0247; G09G 2320/064; G09G 2330/021
See application file for complete search history.

(56) References Cited

U.S. PATENT DOCUMENTS 12,100,339 B1 * 9/2024 Tsai .......................... G09G 3/32
2005/0029872 A1 * 2/2005 Ehrman .................. H02M 1/32 307/11
2011/0141077 A1 * 6/2011 Cho ..................... G09G 3/3426 345/207
2022/0189434 A1 * 6/2022 Kim .......................... G06T 1/20
2025/0225905 A1 * 7/2025 Kuo ..................... G09G 3/2014

FOREIGN PATENT DOCUMENTS

KR 10-2023-0094693 A 6/2023
KR 10-2023-0106059 A 7/2023
KR 10-2023-0110931 A 7/2023

* cited by examiner

*Primary Examiner* — Michael A Faragalla
(74) *Attorney, Agent, or Firm* — Seed Intellectual Law Group LLP

(57) ABSTRACT

A display panel driving circuit according to an embodiment and a display device including the same are disclosed. A display panel driving circuit includes a drive IC configured to supply PWM data of an input image to a plurality of data lines connected to pixels; and a driving control part configured to transmit the PWM data to the drive IC or modulate the PWM data to transmit it to the drive IC according to a result of comparing a grayscale value of the input image with a preset reference grayscale value, wherein the reference grayscale value is preset as a smallest grayscale value in which a flicker does not occur.

5 Claims, 6 Drawing Sheets

| Frequency | Comparative example | embodiment |
|---|---|---|
| f1 | 11.66 | 2.47 |
| f2 | 28.73 | 2.44 |
| f3 | 16.99 | 0.63 |
| f4 | 25.46 | -0.93 |
| f5 | 26.78 | -3.11 |

*FIG. 6*

DISPLAY PANEL DRIVING CIRCUIT AND DISPLAY DEVICE INCLUDING THE SAME

CROSS-REFERENCE TO RELATED APPLICATION

This application claims priority to and the benefit of Korean Patent Application No. 10-2024-0024339, filed Feb. 20, 2024, the disclosure of which is incorporated herein by reference in its entirety.

BACKGROUND

Technical Field

The present disclosure relates to a display panel driving circuit and a display device including the same.

Description of the Related Art

Various flat panel display devices such as a liquid crystal display device, an electroluminescent display device, and the like are known. The electroluminescent display device may display an input image by emitting light by itself without a backlight by using the light-emitting elements disposed on each of the pixels. The light-emitting elements of the electroluminescent display device may be divided into an organic light-emitting element and an inorganic light-emitting element according to the material of the light-emitting layer.

Recently, a display device that uses a light-emitting diode (LED), an inorganic light-emitting element, as a light-emitting element of a pixel has attracted attention as a next-generation display device. Since LEDs are made of inorganic materials, they do not require a separate encapsulation layer to protect organic materials from moisture, and they are more reliable and have a longer lifespan than organic light-emitting diodes (OLEDs). In addition, LEDs have a fast lighting speed, excellent luminous efficiency, and impact resistance.

SUMMARY

There are two methods of driving the display device, an active matrix method and a passive matrix method. Since a display device of the passive matrix method is self-luminous by current driving, it does not require a backlight that emits light from the back, which can reduce power consumption.

In the LED display device of the passive matrix method, a plurality of LEDs may be disposed in a predetermined arrangement. A plurality of LEDs disposed in the LED display device may be driven by using pulse width modulation (PWM) data. However, when driving of the LED is controlled by using the PWM data, a phenomenon in which the luminance floats at a low grayscale, such as a black floating phenomenon, may occur, and the off duty period becomes longer compared to the on duty period of the PWM data, and thus a problem such as a flicker or an acoustic noise may occur.

The present disclosure solves, among others, all the above-described problems.

The present disclosure provides a display panel driving circuit and a display device including the same.

It should be noted that features of the present disclosure are not limited to those above-described, and other features and characteristics of the present disclosure will be apparent to those skilled in the art from the following descriptions.

A display panel driving circuit according to embodiments of the present disclosure may include a drive IC configured to supply PWM data of an input image to a plurality of data lines connected to pixels; and a driving control part configured to transmit the PWM data to the drive IC or modulate the PWM data to transmit it to the drive IC according to a result of comparing a grayscale value of the input image with a preset reference grayscale value, wherein the reference grayscale value is preset as a smallest grayscale value in which a flicker does not occur.

A display device according to embodiments of the present disclosure may include a pixel array including a plurality of data lines, a plurality of scan lines, and pixels; a line selection part configured to supply a driving voltage to the plurality of scan lines; a drive IC configured to supply PWM data of an input image to the plurality of data lines; and a driving control part configured to transmit the PWM data to the drive IC or modulate the PWM data to transmit it to the drive IC according to a result of comparing a grayscale value of the input image with a preset reference grayscale value, wherein the reference grayscale value is preset as a smallest grayscale value in which a flicker does not occur.

The present disclosure may achieve target luminance at a low grayscale by outputting PWM data at a predetermined duty ratio or by modulating the voltage level and duty ratio of the PWM data to output modulated PWM data according to the grayscale value of the input image.

In the present disclosure, the flicker may be improved and sound noise may be reduced.

In the present disclosure, since power consumption may be reduced, low power driving may be possible.

The effects of the present specification are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which:

FIG. 6 is a diagram illustrating a result of acoustic noise generation according to a comparative example and an embodiment.

DETAILED DESCRIPTION

Figure 1:
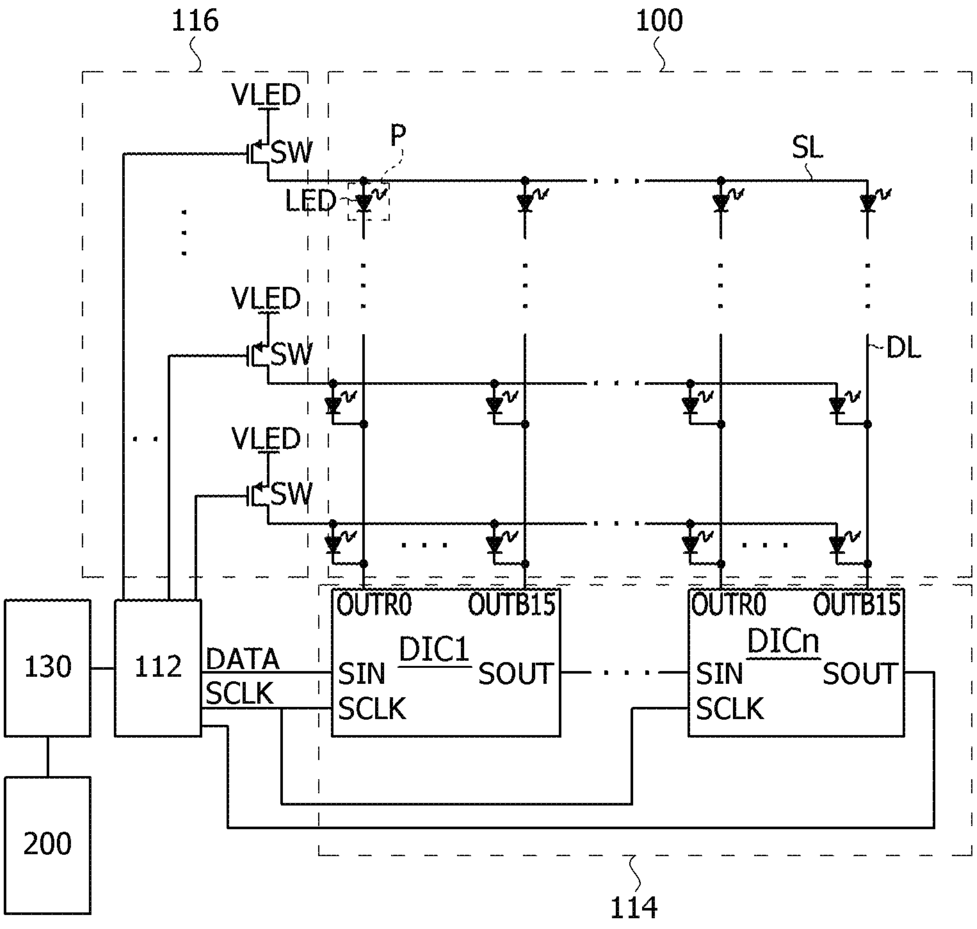
FIG. 1 is a block diagram illustrating a display device according to one embodiment of the present disclosure.

Advantages and features of the present specification and methods of achieving them will become apparent with reference to example embodiments, which are described in detail, in conjunction with the accompanying drawings. However, the present specification is not limited to the embodiments to be described below and may be implemented in different forms, the embodiments are only provided to completely disclose the present disclosure and completely convey the scope of the present disclosure to those skilled in the art, and the scope of present specification include those of the claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When 'including,' 'having,' 'consisting,' and the like mentioned in the present specification are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as 'on,' 'at an upper portion,' 'at a lower portion,' 'next to,' and the like, one or more other parts may be located between the two parts unless 'immediately' or 'directly' is used.

Although first, second, and the like are used to describe various components, these components are not limited by these terms. These terms are only used to distinguish one component from another. Accordingly, a first component, which is mentioned, below may also be a second component within the technical spirit of the present disclosure.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2A:
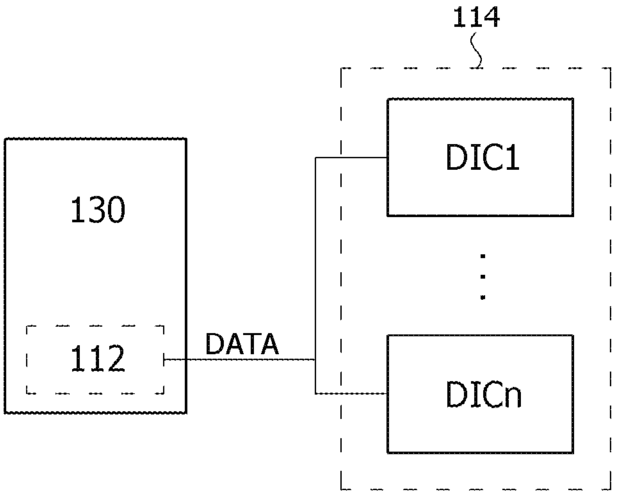
FIGS. 2A to 2B are diagrams illustrating an arrangement of the driving control part shown in FIG. 1.
Figure 2B:
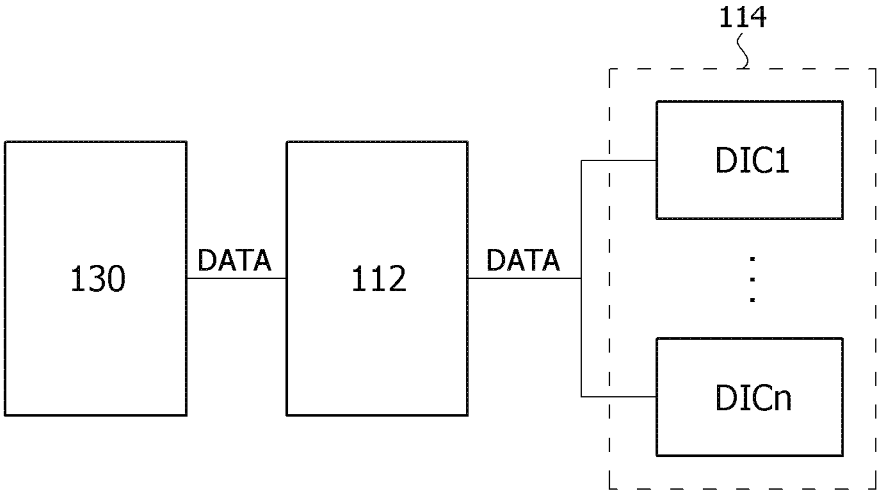
Figure 3:
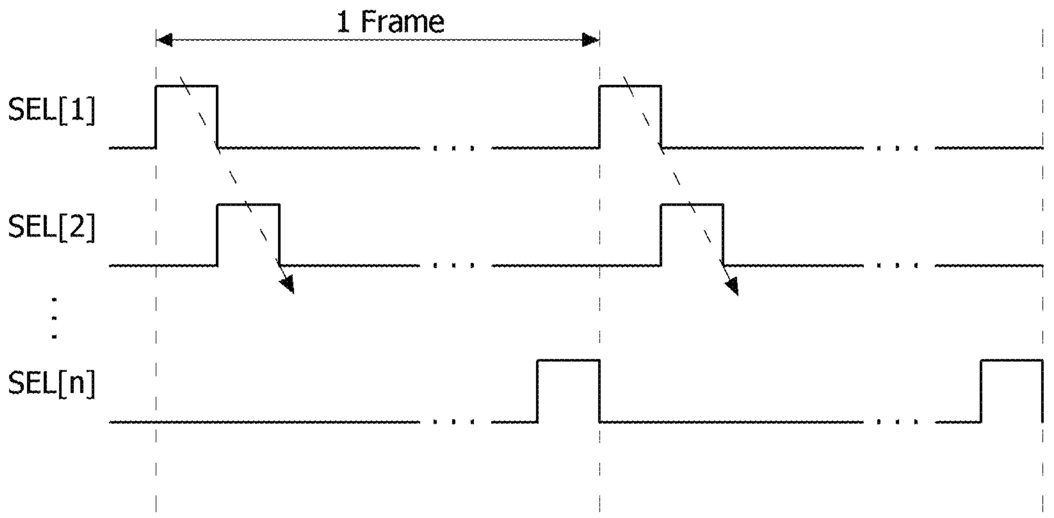
FIG. 3 is a diagram illustrating a waveform of a line selection signal applied to a scan line illustrated in FIG. 1.

FIG. 1 is a block diagram illustrating a display device according to one embodiment of the present disclosure, FIGS. 2A to 2B are diagrams illustrating an arrangement of the driving control part shown in FIG. 1, and FIG. 3 is a diagram illustrating a waveform of a line selection signal applied to a scan line illustrated in FIG. 1.

Referring to FIG. 1, a display device according to an embodiment of the present disclosure includes a display panel 100, a display panel driving circuit for writing pixel data to pixels of the display panel 100, and pixels P.

The substrate of the display panel 100 may be a plastic substrate, a thin glass substrate, or a metal substrate, but is not limited thereto. The display panel 100 may be a rectangular structured panel having a length in an X-axis direction (or a first direction), a width in a Y-axis direction (or a second direction), and a thickness in a Z-axis direction (or a third direction), but is not limited thereto. For example, at least a portion of the display panel 100 may have a curved outer portion.

The display panel 100 may be implemented as a non-transmissive display panel or a transmissive display panel. The transmissive display panel may be applied to a transparent display device in which an image is displayed on a screen and an actual object is visible beyond the display panel. The display panel 100 may be manufactured as a flexible display panel. Also, the display panel 100 may be manufactured as a stretchable panel that is capable of being stretched.

The display panel 100 includes a pixel array displaying an input image. The pixel array includes a plurality of data lines DL, a plurality of scan lines SL intersecting the data lines DL, and pixels P arranged in a matrix form.

The pixels P may be divided into a red pixel, a green pixel, and a blue pixel for color implementation. At least one light-emitting element LED may be disposed in each of the pixels P.

The light-emitting element LED may include an anode electrode, a cathode electrode, and a light-emitting layer. The light-emitting element LED may be a light-emitting element such as an OLED, a mini LED, a micro LED, etc., but is not limited thereto. In the case of a mini LED or a micro LED, it may be a vertical structure in which electrodes are disposed above and below a semiconductor chip in which the light-emitting element is integrated, but is not limited thereto. The semiconductor chip in which the light-emitting element is integrated may be implemented in a lateral structure or a flip chip structure.

A plurality of scan lines SL may be connected to an anode electrode of the LED, and a plurality of data lines DL may be connected to a cathode electrode of the LED.

The pixel array includes a plurality of pixel lines. Each of the pixel lines includes one line of pixels disposed along the line direction (X-axis direction) in the pixel array of the display panel 100. Pixels disposed in one pixel line may share the scan line SL. Pixels disposed in the column direction (Y-axis direction) along the data line direction may share the same data line DL. One horizontal period is time obtained by dividing one frame period by the total number of pixel lines.

The display panel 100 according to the embodiment may be implemented in a passive matrix (PM) method so that the LED may be controlled for each scan line, but is not necessarily limited thereto, and the LED may be individually controlled by being implemented in an active matrix (AM) method.

The timing controller 130 may receive PWM data, which is image data, from the host system and supply the input PWM data to the display panel driving circuit. The timing controller 130 may control the operation timing of the display panel driving circuit.

The display panel driving circuit writes pixel data of the input image to pixels of the display panel 100 under the control of the timing controller 130. The display panel driving circuit may include a driving control part 112, a drive integrated circuit (IC) 114, and a line selection part 116.

The driving control part 112 may receive PWM data, which is an input image, from the host system 200 or the timing controller 130, select the first driving mode or the second driving mode according to the grayscale value of the received PWM data, and according to the selected result, output the PWM data as it is, or modulate the duty ratio and voltage level of PWM data by a predetermined size and then output the same.

As an example, the driving control part 112 may select a first driving mode if the grayscale value of the PWM data is equal to or greater than a predetermined reference grayscale value, and may select a second driving mode if not.

As another example, the driving control part 112 may output PWM data received according to the selected first driving mode as it is, and may convert and output the duty ratio and voltage level of PWM data according to the selected second driving mode.

The driving control part 112 may control the driving of a plurality of LEDs by transmitting PWM data or modulated PWM data. The driving control part 112 may control the duty ratio and voltage level of PWM data by controlling the timing or intensity of driving current transmitted to a plurality of LEDs.

The LED may be driven by pulse width modulation (PWM), and brightness may be determined according to a ratio of a turn-on time in a PWM control time. When the light-emitting element is turned on by the driving current, a forward voltage may be formed in the light-emitting element, and the product of the forward voltage and the driving current, when accumulated over the turn-on time within the PWM control time, becomes the amount of driving power supplied to the light-emitting element, and the brightness of the light-emitting element may be determined according to the amount of driving power. Assuming that the magnitude of the forward voltage and the driving current of the light-emitting element is a fixed variable, the amount of driving power may be considered as a value proportional to the turn-on time in the PWM control time, and according to this principle, the driving control part 112 may control the brightness of the LED and the brightness of the pixel P by controlling the turn-on time in the PWM control time.

The driving control part 112 may be disposed inside the timing controller 130 as shown in FIG. 2A or may be physically separated from the timing controller 130 as shown in FIG. 2B. In an embodiment, the driving control part 112 is configured separately from the timing controller 130 and may control operations of a plurality of LEDs based on PWM data received from the timing controller 130.

The line selection part 116 may include a plurality of selection switch elements SW. A plurality of selection switch elements SW may be disposed at one end of each of the scan lines SL. The selection switch element SW may be turned on or off by the line selection signal SEL applied from the driving control part 112. The selection switch element SW includes a first electrode connected to a power line to which a driving voltage VLED is applied, a gate electrode to which a line selection signal SEL is applied from the driving control part 112, and a second electrode connected to the scan line. A plurality of selection switch elements SW may be time-divided for each frame and sequentially turned on.

The selection switch element SW may be implemented as an N-channel TFT, but may be implemented as a P-channel TFT if necessary. When the selection switch element SW is implemented as a P-channel TFT, an inverter may be connected to a gate electrode to which a line selection signal is applied.

As shown in FIG. 3, the selection switch element SW may be sequentially turned on by the line selection signals SEL[1] to SEL[n] to supply a driving voltage VLED to the corresponding scan line.

When the selection switch element SW is turned on, driving current flows through the corresponding scan line, so that all of the plurality of LEDs connected to the corresponding scan line may emit light.

The drive IC 114 may receive PWM data or modulated PWM data from the driving control part 112 and supply the received PWM data or modulated PWM data to the data line DL. The drive IC 114 may include a plurality of drive ICs DIC1 to DICn. Each of the plurality of drive ICs DIC1 to DICn may be connected to the plurality of data lines DL. Each of the plurality of drive ICs DIC1 to DICn may receive clock signals SCLK from the driving control part 112 and supply PWM data or modulated PWM data to the plurality of data lines according to the received clock signals SCLK.

The plurality of drive ICs DIC1 to DICn may be electrically connected to each other to transmit clock signals or PWM data.

As an example, the PWM data may be input to the input terminal SIN of the first drive IC DIC1, and may be transmitted to the input terminal SIN of the next drive IC through the output terminal SOUT of the first drive IC DIC1.

As another example, the clock signal SCLK may be transmitted to each of the plurality of drive ICs DIC1 to DICn.

The host system 200 may scale the image signal from the video source to match the resolution of the display panel 100 and transmit the same to the timing controller 130 together with the timing signal.

The host system may be any one of a television (TV) system, a set-top box, a navigation system, a personal computer (PC), a home theater system, a vehicle system, and a mobile device system.

Figure 4:
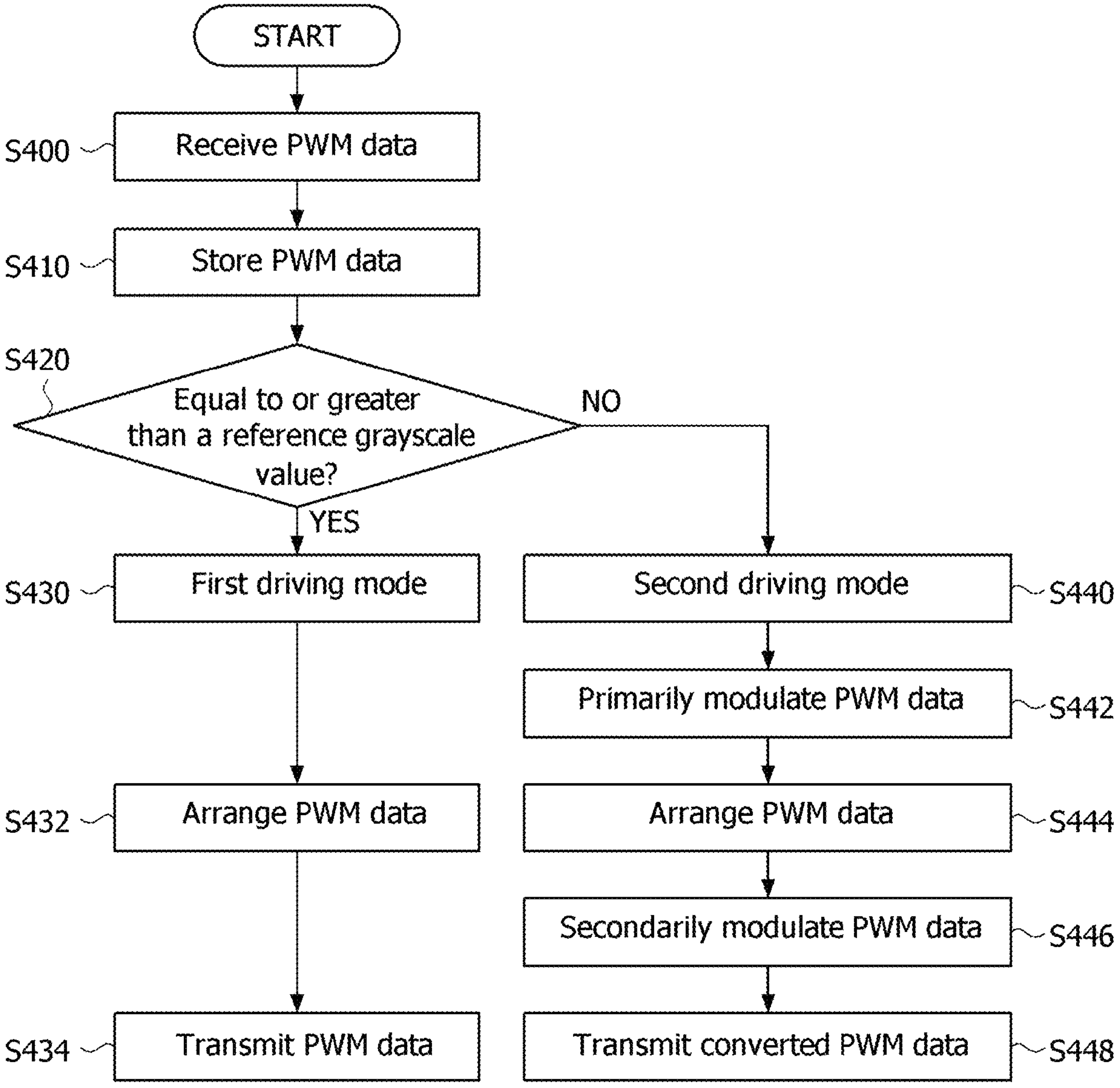
FIG. 4 is a diagram illustrating an LED driving method according to an embodiment of the present disclosure.

FIG. 4 is a diagram illustrating an LED driving method according to an embodiment of the present disclosure.

Referring to FIG. 4, the driving control part according to an embodiment of the present disclosure may receive PWM data, which is pixel data of an input image, from an external system or a timing controller (S400), and store the received PWM data in a line memory (S410).

Next, the driving control part may check whether a grayscale value of the stored PWM data is equal to or greater than a preset reference grayscale value (S420). If the grayscale value of the stored PWM data is equal to or greater than the preset reference grayscale value, the driving control part may activate the first driving mode (S430). Here, the first driving mode may be a mode for driving the LED by using PWM data.

Here, the reference grayscale value is a grayscale value for distinguishing the first driving mode and the second driving mode, and may be set to a smallest grayscale value in which a flicker does not occur. The flicker is a phenomenon in which the intensity of light emitted from the display panel is not constant and changes periodically over time, and refers to a phenomenon in which a user feels the flickering of a screen.

Next, the driving control part may arrange the PWM data stored according to the activated first driving mode into data units for providing each of the plurality of drive ICs and store them in the line memory (S432).

Next, the driving control part may convert the arranged PWM data according to a serial peripheral interface (SPI) protocol and transmit the converted PWM data to each drive IC (S434).

In contrast, if the grayscale value of the stored PWM data is less than the preset reference grayscale value, the driving control part may activate the second driving mode (S440). Here, the second driving mode may be a mode for driving the LED by using the modulated PWM data.

Next, the driving control part may primarily modulate the received PWM data using a preset lookup table (LUT) based on the grayscale value of the PWM data according to the activated second driving mode (S442). For example, the driving control part may modulate the duty ratio of PWM data according to the grayscale value of PWM data using the preset lookup table.

Next, the driving control part may arrange the primarily modulated PWM data into data units for providing each of the plurality of drive ICs and store them in the line memory (S444).

Next, the driving control part may secondarily modulate the primarily modulated PWM data using a preset voltage value (S446).

Next, the driving control part may convert the secondary modulated PWM data or PAM data according to the serial peripheral interface (SPI) protocol and transmit the converted PWM data to each drive IC (S448).

Figure 5:
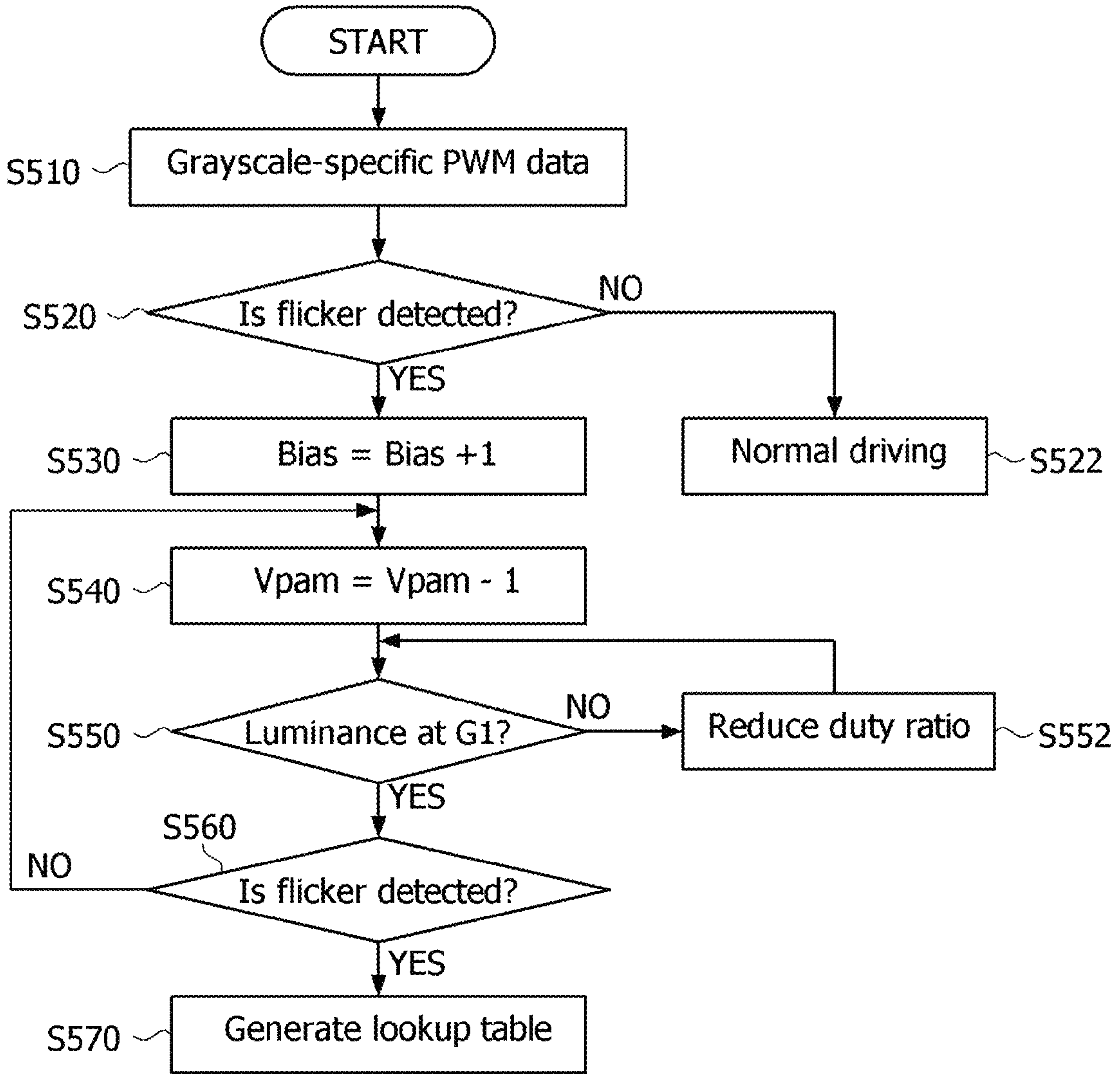
FIG. 5 is a diagram for explaining a principle of generating a reference grayscale value, a voltage level, and a lookup table.

FIG. 5 is a diagram for explaining a principle of generating a reference grayscale value, a voltage level, and a lookup table.

Referring to FIG. 5, if the PWM data, which is grayscale-specific pixel data, is received (S510), the measurement device according to an embodiment of the present disclosure may detect a flicker generation point or a flicker generation grayscale value by analyzing the received PWM data (S520). Here, the grayscale-specific PWM data may include the PWM data from a first grayscale Gray_1 to a reference grayscale Gray_Bias.

Next, if the flicker is not detected, the measuring device may determine normal driving (S522).

Conversely, if the flicker is detected, the measuring device may increase the reference grayscale value Bias by a certain amount (S530). For example, the measuring device may increase the reference grayscale value by 1.

As an example, if the flicker generation grayscale value is Gray_60, the reference grayscale value becomes Gray_61.

Next, the measuring device may reduce the voltage level Vpam of the PWM data by a certain amount (S540), and check whether the PWM data with the reduced voltage level satisfies the luminance at the lowest grayscale, that is, the luminance at the first grayscale G1 (S550). For example, the measuring device may reduce the voltage level of the PWM data by IV. Here, that the luminance at the first grayscale is satisfied means that a predetermined luminance range at the first grayscale is satisfied.

As one example, if the voltage level of the PWM data is 10V, the voltage level is reduced by 1 to become 9V.

Next, if the PWM data with the reduced voltage level does not satisfy the luminance of the first grayscale, the measuring device may reduce the duty ratio of the PWM data by a predetermined amount (S552). For example, the measuring device may reduce the duty ratio of the PWM data by 10%.

On the other hand, if the PWM data with the reduced voltage level satisfies the luminance of the first grayscale, the measuring device may detect the flicker generation point by analyzing the PWM data with the reduced voltage level (S560).

Next, if the flicker is detected, the measuring device may repeatedly perform the process of reducing the voltage level Vpam of the PWM data by one.

On the other hand, if the flicker is not detected, the measuring device may generate a lookup table for compensating for luminance (S570). Here, the lookup table may include the duty ratio for each luminance.

In an embodiment, by modulating the PWM data using this generated lookup table, target luminance may be achieved at low grayscale as well as the flicker may be improved.

FIG. 6 is a diagram illustrating a result of acoustic noise generation according to a comparative example and an embodiment.

Referring to FIG. 6, if the duty of the PWM data is 100%, it may be seen that the acoustic noise according to the frequencies f1 to f5 is significantly reduced in the embodiment compared to a comparative example. Here, the frequencies may be higher frequencies in the order of f1, f2, f3, f4, and f5.

In addition, it was confirmed that even if the duty of the PWM data was reduced in the order of 80%, 60%, 40%, and 20%, the acoustic noise according to the frequency was significantly reduced in the embodiment compared to the comparative example.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel driving circuit comprising:

a drive IC configured to supply PWM data of an input image to a plurality of data lines connected to pixels; and a driving control part configured to transmit the PWM data to the drive IC or modulate the PWM data to transmit it to the drive IC according to a result of comparing a grayscale value of the input image with a preset reference grayscale value, wherein the reference grayscale value is preset as a smallest grayscale value in which a flicker does not occur, wherein the driving control part is configured to modulate a duty ratio of the PWM data using a pre-stored lookup table and to modulate a voltage level of the modulated PWM data using a preset voltage value in response to the grayscale value of the input image is less than the reference grayscale value.

2. A display device comprising:

a pixel array including a plurality of data lines, a plurality of scan lines, and a plurality of pixels;

a line selection part configured to supply a driving voltage to the plurality of scan lines;

a drive IC configured to supply PWM data of an input image to the plurality of data lines; and a driving control part configured to transmit the PWM data to the drive IC or to modulate the PWM data to transmit it to the drive IC according to a result of comparing a grayscale value of the input image with a preset reference grayscale value, wherein the reference grayscale value is preset as a smallest grayscale value in which a flicker does not occur, wherein the driving control part is configured to modulate a duty ratio of the PWM data using a pre-stored lookup table and to modulate a voltage level of the modulated PWM data using a preset voltage value in response to the grayscale value of the input image is less than the reference grayscale value.

3. The display device of claim 2, wherein:

each of the plurality of pixels includes at least one light-emitting element, an anode electrode of the light-emitting element is connected to a scan line, and a cathode electrode of the light-emitting element is connected to a data line.

4. The display device of claim 2, wherein:

the line selection part includes a plurality of selection switch elements connected to each of the plurality of scan lines, and the selection switch element includes a gate electrode connected to receive a line selection signal from the driving control part, a first electrode connected to a power line to which the driving voltage is applied, and a second electrode connected to the scan line.

5. The display device of claim 2, further comprising:

a timing controller configured to control the operation timing of the line selection part and the drive IC, wherein the driving control part is disposed inside the timing controller.

* * * * *